United States Patent

Bonnet

Patent Number: 5,359,916
Date of Patent: Nov. 1, 1994

[54] PERFORATOR

[76] Inventor: Werner Bonnet, Muhlackerstr. 6, 7140 Ludwigsburg 12, Germany

[21] Appl. No.: 646,749
[22] PCT Filed: Dec. 6, 1989
[86] PCT No.: PCT/DE89/00754
§ 371 Date: Jan. 8, 1991
§ 102(e) Date: Jan. 8, 1991
[87] PCT Pub. No.: WO90/06215
PCT Pub. Date: Jun. 14, 1990

[30] Foreign Application Priority Data

Dec. 9, 1988 [DE] Germany ............... 3841492
Aug. 3, 1989 [DE] Germany ............... 3925667

[51] Int. Cl.⁵ .................................. B26F 1/08
[52] U.S. Cl. .......................... 83/482; 83/506; 83/508.1; 83/508.3; 83/563; 83/639.1; 83/676; 92/177
[58] Field of Search ............ 83/482, 503, 508.1, 83/508.2, 508.3, 675, 495, 506, 563, 639.1, 676, 881, 481; 92/168, 177

[56] References Cited

U.S. PATENT DOCUMENTS

| | | | |
|---|---|---|---|
| 2,997,906 | 8/1961 | Burk et al. | 83/676 X |
| 3,564,962 | 2/1971 | Wingen | 83/506 |
| 3,892,156 | 7/1975 | Johnstone | 83/469 |
| 3,977,284 | 8/1976 | Mastriani et al. | 83/495 |
| 4,080,877 | 3/1978 | de Fries | 92/177 X |
| 4,561,335 | 12/1985 | Wingen | 83/481 |
| 4,623,420 | 11/1986 | Hinkley | 92/177 X |
| 4,678,457 | 7/1987 | Slobodkin | 83/881 X |
| 4,741,234 | 5/1988 | Colombo | 83/482 X |

FOREIGN PATENT DOCUMENTS

| | | |
|---|---|---|
| 0238686 | 3/1986 | European Pat. Off. |
| 3439199 | 2/1986 | Germany |
| 0024203 | 3/1981 | Japan ............... 92/177 |
| 2074492 | 4/1981 | United Kingdom |

OTHER PUBLICATIONS

English Translation of German patent No. 3,439,199 C1 to Werner Bonnet published Feb. 20, 1986.

Primary Examiner—Richard K. Seidel
Assistant Examiner—Raymond D. Woods
Attorney, Agent, or Firm—Speckman, Pauley & Fejer

[57] ABSTRACT

A perforator has a perforator disk rotatably seated in a U-shaped bearing bracket. The bearing bracket is movable into and out of the path of movement of a piece to be perforated by a piston-cylinder unit which is actuated from either side of the piston. The piston-cylinder unit is housed in a fastening element which can be connected to a machine frame. The bearing bracket has guide bolts which extend into the fastening element to secure the bearing bracket against rotation in respect to the fastening element. The fastening element comprises a cylinder having a blind bore extending from the side of the fastening element facing the U-shaped bearing bracket in which a piston having seal rings is sealingly guided in a displaceable manner.

21 Claims, 2 Drawing Sheets

PERFORATOR

BACKGROUND OF THE INVENTION

1. Field of the Invention

The invention relates to a perforator with a perforating disk rotatably seated in a U-shaped bearing bracket. The bearing bracket is moved into and out of the path of movement of a piece to be perforated by a piston-cylinder unit which can be actuated from either side. The piston-cylinder unit is housed in a fastening element which can be connected to a machine frame by guide bolts movably disposed in the bearing bracket which maintain the bearing bracket fixed against rotation in respect to the fastening element.

2. Description of Prior Art

A perforator of this type is disclosed in German Patent DE-PS 34 39 199. As disclosed therein, the fastening element is an open tray, the bottom of which is oriented towards the bearing bracket and which is closed on the side away from the bearing bracket by a cover. A commercially available piston-cylinder unit is used for displacing the bearing bracket with the perforating disk, which consists of a piston with a piston rod housed in a cylinder housing. This piston-cylinder unit is housed in the tray-shaped fastening element. Therefore the guide bolts for the bearing brackets must have a distance larger than the sum of the diameter of the cylinder housing and the diameter of the guide bushings for the bearing bracket. This establishes a minimum size for the perforator.

An object of the invention is to simplify the structure of a perforator of the previously mentioned type and to reduce the size of the perforator in the process.

This object is attained in accordance with the invention where a quadrate fastening element in the form of a cylinder has a blind bore extending from the side facing a bearing bracket, in which a piston, which is provided with seal rings, is sealingly guided in a displaceable manner. The blind bore is closed by means of a seal bushing through which extends a piston rod connected to a piston, which piston is connected to the bearing bracket. The blind bore transforms on the side facing the bearing block into an end section with a larger diameter forming a shoulder against which the seal bushing rests. In another embodiment the cylinder as a fastening element is plate-shaped and oriented to the plane of the perforating disk. A plate-shaped piston is displaceably guided in a quadrate sealed recess of the cylinder and is fixedly connected with the bearing bracket by a sealed piston rod displaceably guided in the cylinder. Both sides of the piston which extend crosswise to the displacement direction of the piston are provided with sealing elements which seal on all sides in the direction of the recess of the cylinder.

In this embodiment the fastening element forms the cylinder housing of the piston-cylinder unit and does not require a cover. It is possible to reduce the length of the two guide bolts of the bearing bracket so that the structural height of the perforator as a whole is reduced. The determining dimension for the length of the guide bolts in this embodiment is the diameter of the blind bore, which corresponds to the interior diameter of the cylinder housing of the known perforator, or the dimension of the quadrate recess in the fastening element as well as the diameter of the guide bushings of the guide bolts of the bearing bracket.

In accordance with an embodiment of this invention the seal bushing is fixed by a retaining ring in the end section of the blind bore and is maintained in contact with the shoulder, limiting the displacement path of the piston and providing the piston rod with additional guidance.

An absolutely straight guidance of the bearing bracket is attained where the guide bolts of the bearing bracket are guided in guide bushings, which are inserted into bores of the quadrate fastening element and are immovably held in the bores at both ends by retaining rings. The installation of the guide bushings is made easier and improved where the bores only extend over part of the thickness of the quadrate fastening element and, on the side facing away from the bearing bracket, transform into end sections with enlarged diameters in which are placed on the receptacle, the retaining ring for securing the guide bushings and are closed by a threaded plug.

Securing the perforator on the machine frame is achieved in a simple manner by the quadrate fastening element comprising a fastening clamp together with an L-shaped part formed of one piece with it, and the leg of the part facing away from the fastening element being provided with a through-bore to receive a fastening screw.

In accordance with one embodiment, the simple manufacture of the fastening element is made possible where the recess is in the form of an opening in the cylinder into which a rectangular tube section is sealingly seated as a piston guidance. The open front ends of the rectangular tube section tightly adjoin the facing sides of the recess in the cylinder. In accordance with a further embodiment of this invention, the free side walls of the rectangular tube section end flush with the facing sides of the plate-shaped cylinder.

In accordance with a further embodiment of the invention, the piston-cylinder unit is designed in such a way that the recess is in the shape of an opening in the cylinder and that after insertion of the piston into the recess the latter is tightly covered by means of two cover plates and the cylinder chamber for the piston is thus complemented.

In both cases it has been advantageously provided that the dimensions of the cylinder in the direction of the axis of rotation of the perforating disk correspond to the associated dimensions of the bearing bracket.

The two-sided actuation of the piston-cylinder unit is provided in a simple manner where the control lines for the piston-cylinder unit enter into the cylinder and end, in the area of the sides oriented crosswise to the direction of movement of the piston, in the recess of the cylinder. The control lines are accessible through threaded connections in a side extending parallel to the displacement direction of the piston.

The sealed displacement of the piston rod in the cylinder is attained in accordance with one embodiment of this invention where the piston rod is sealed by a sealing element which is maintained by a closing element in a widened shoulder of the bore in the cylinder for receiving the piston rod.

The function of the cylinder as a fastening element is simply achieved where the cylinder has, outside of the piston-cylinder unit in the end section facing away from the bearing bracket, a fastening receptacle, T-shaped in cross section, in which a threaded bore for receiving a fastening screw ends.

BRIEF DESCRIPTION OF THE DRAWINGS

The invention will be described in detail by means of exemplary embodiments shown in the drawings.

Figure 2:
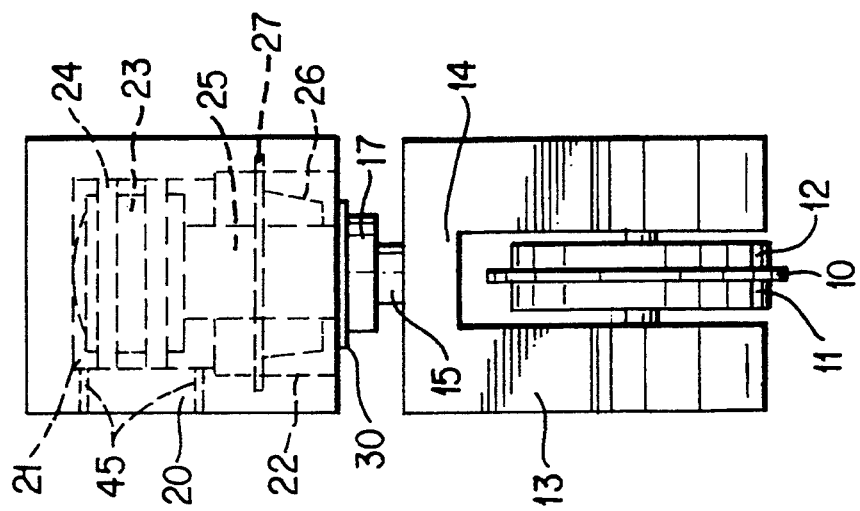
FIG. 2 shows the view of the perforator in accordance with FIG. 1, looking towards the front of the perforating disk.
Figure 1:
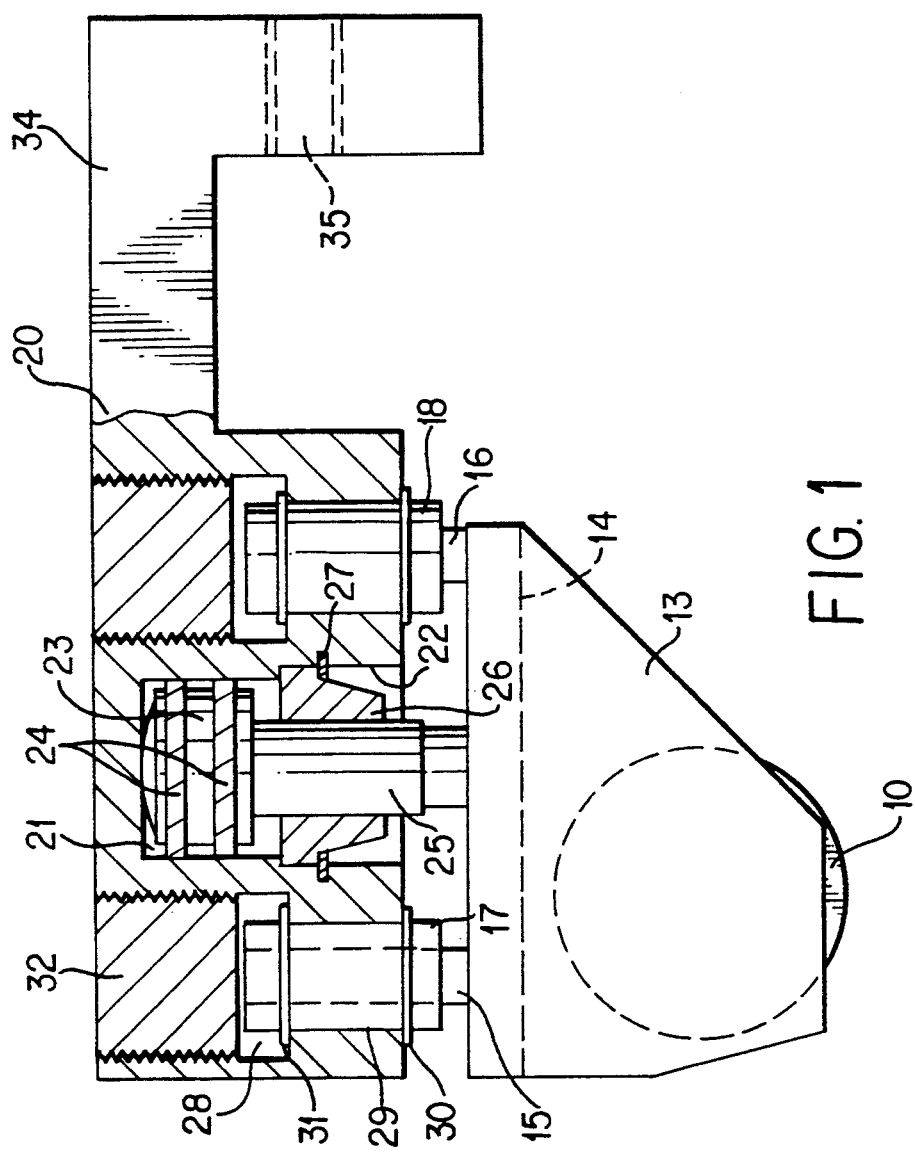
FIG. 1 shows a lateral view of partially cut areas of a first exemplary embodiment of a perforator in accordance with the invention, looking toward the broad side of the perforating disk.

In the exemplary embodiment in accordance with FIGS. 1 and 2, the perforating disk 10 is fixed between the two support disks 11 and 12 and rotatably seated in the two lateral legs of the U-shaped bearing bracket 13. For this purpose the bearing bolt for the perforating disk 10 may be seated by means of ball bearings in the lateral legs of the bearing bracket 13.

The fastening element 20 is quadrate together with the L-shaped part 34, which is formed of one piece with it, and forms a fastening clamp together with the bearing bracket 13, with which the perforator is fastened to the machine frame. The leg of the L-shaped part 34 facing away from the bearing bracket 13 has a through-bore 35 for a fastening screw.

The crosspiece 14 of the bearing block 13 is displaceably guided in the guide bushings 17 and 18 by the two guide bolts 15 and 16. The bore 29 is inserted into the fastening element 20 to receive the guide bushing 17. At the end facing away from the bearing bracket 13, the bore 29 transforms into the end section 28 with an increased diameter, which is sufficiently large to permit the placement of the retaining ring 31 on the guide bushing 17 which extends into the end section 28. The guide bushing 17 projects from the side of the fastening element 20 facing the bearing bracket 13, so that the retaining ring 30 can be attached. The retaining rings 30 and 31 fix the guide bushing 17 in the bore 29 so that it cannot be displaced. The guide bushing 18 for the guide bolt 16 is fixed in the same manner in the fastening element 20. The end section 28 is closed off by means of the threaded plug 32 which is screwed into the thread of the end section 28. It is also possible to provide the closure by a closure plug which is held in the end section 28 by means of snug and/or press fit.

The piston-cylinder unit for adjusting the bearing block 13 is disposed between the two guide bushings 17 and 18.

The cylinder housing is formed by the fastening element 20 itself. The blind bore 21, in which the piston 23 provided with seal rings 24 is sealingly adjustable, has been inserted in the side of the fastening element 20 facing towards the bearing bracket 13. The connecting conduits 45 end in the blind bore 21, so that the piston 23 can be actuated from either side and displaced in both directions. On the side facing the bearing bracket 13, the blind bore 21 transforms into the end section 22 with increased diameter, creating a shoulder against which the seal bushing 26 lies. This seal bushing 26 is fixed in the end section 22 by means of the retaining ring 27 and is kept abutting against the shoulder of the blind bore 21. The piston rod 25 is additionally guided in and extends through the seal bushing 26 and is fixedly connected with the bearing bracket 13, i.e. its crosspiece 14.

The construction of the perforator has been very much simplified as far as the fastening element and the piston-cylinder unit are concerned, and results in a considerably smaller structure without having a negative effect on its operation.

Figure 3:
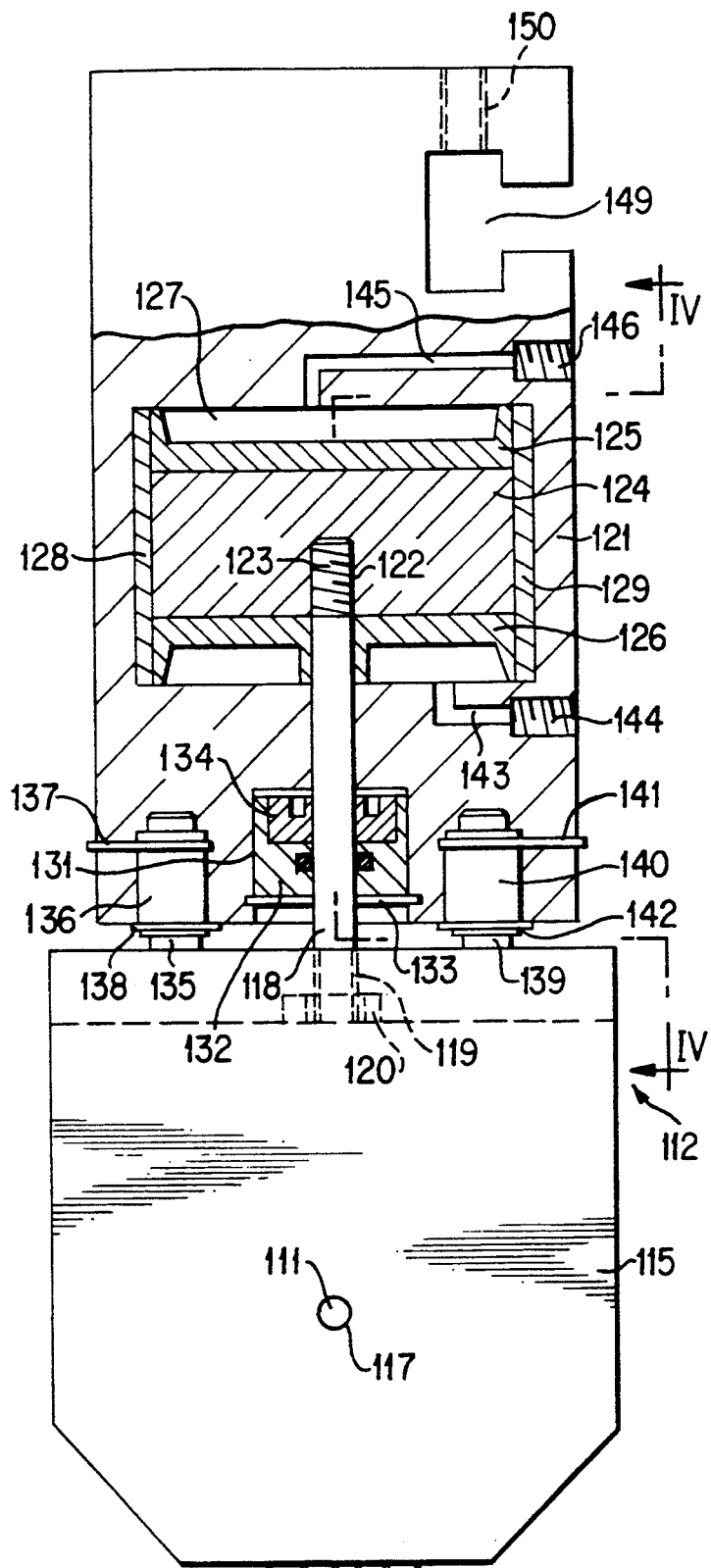
FIG. 3 shows a further exemplary embodiment of a perforator in accordance with the invention, looking in the direction of the axis of rotation of the perforating disk, in which the plate-shaped piston is displaceable in a rectangular tube section tightly inserted in a recess of a plate-shaped cylinder.
Figure 4:
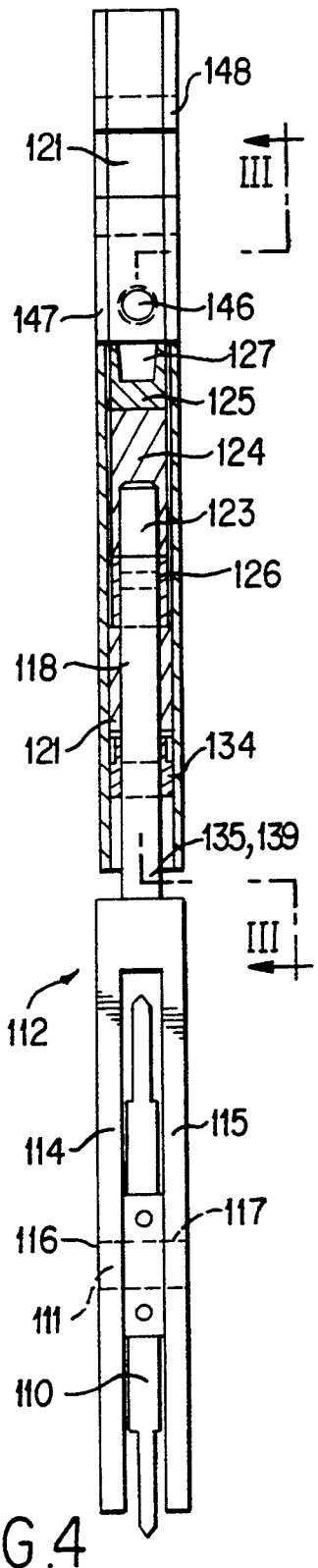
FIG. 4 shows a perforator in accordance with FIG. 3 viewed in a direction vertically to the axis of rotation of the perforating disk, in which the plate-shaped piston is displaceably guided in a tightly constructed cylinder.

In the exemplary embodiments of this invention in accordance with FIGS. 3 and 4, the perforating disk 110 is rotatably seated with the rotating shaft 111 in the bores 116 and 117 of the bearing plates 114 and 115 of the U-shaped bearing block 112. The rotating shaft 111 may be stationary and only the perforating disk may be rotatable. But both the perforating disk 110 and the rotating shaft 111 may be jointly rotatable.

The displacement movement is transferred to the bearing bracket 112 by means of the piston rod 118, which is controlled by the piston-cylinder unit actuable from both sides. The disposition and design of the piston-cylinder unit are of prime importance in order to achieve, particularly in the direction of the rotating shaft of the perforating disk 110, as small a dimension, which essentially is determined only by the dimensions of the bearing bracket 112.

The two guide bolts 135 and 139, which are disposed on both sides of the piston rod 118 and are seated in the seat bushings 136 and 140 take over the non-rotatable guidance of the bearing bracket 112. These seat bushings 136 and 140 are inserted into blind bores of the plate-shaped cylinder and are maintained therein by the retaining rings 137 and 138 or 141 and 142.

The piston rod 118 ends in the threaded part 119 which has been screwed into the threaded receptacle 120 of the bearing bracket 112. The threaded receptacle 120 may also be a nut. The upper end of the piston rod 118 also ends in a threaded part 123 which is screwed into the threaded receptacle 122 of the piston 124.

In the exemplary embodiment of this invention in accordance with FIG. 3, the fastening element is used as cylinder 121. The cylinder 121 is in the shape of a plate and has a thickness which corresponds to the dimension of the bearing bracket 112 in the direction of the rotating shaft 111 of the perforating disk 110. The rectangularly-shaped recess 127 is cut into the cylinder 121 and extends completely through the plate. A rectangular tube section, from which the two side walls 128 and 129 have been cut, is tightly inserted into the recess 127 as a piston guide. The piston 124 is also plate-shaped and its cross section matched to the interior cross section of the rectangular tube section. The piston 124 has, on the two sides directed crosswise to the direction of movement, sealing elements 125 and 126, which seal on all four sides in the direction towards the rectangular tube section. The control lines 143 and 145 for the actuation of the piston-cylinder unit on both sides terminate in the cylinder chamber enclosed by the rectangular tube section on the sides of the recess 127 which extends crosswise to the direction of movement of the piston 124.

The control lines 143 and 145 are run on the narrow side of the cylinder 121 and terminate there as threaded connections 144 and 146.

In the end area facing away from the bearing block 112, the cylinder 121 has the T-shaped fastening receptacle 149, in which a threaded bore 150 for a fastening screw terminates, so that the perforator can be fastened to a machine frame.

The piston rod 118 is sealingly guided in the cylinder 121, as shown by the sealing element 134 which is secured in a widened shoulder 131 of the bore for the piston rod 118. Securing is provided by the closing element 132 which in turn is secured in the cylinder by a retaining ring 133. The plate-shaped cylinder 121 is used as a fastening means, as guide for the piston rod and guide bolts of the bearing bracket 112, as well as for receiving the rectangular tube section acting as a piston guide.

In the exemplary embodiment of this invention in accordance with FIG. 4, the cylinder 121 is complemented by means of the two cover plates 147 and 148, which tightly seal the recess 127 in the plate-shaped cylinder 121 on both sides. A separate piston guidance in the form of a rectangular tube section is then no longer required.

The line IV—IV in FIG. 3 schematically indicates the course of the section line in the exemplary embodiment in accordance with FIG. 4, and the line III—III of FIG. 4 indicates the course of the section in the exemplary embodiment in accordance with FIG. 3.

I claim:

1. In a perforator having a perforator disk (10; 110) rotatably sealed in a U-shaped bearing bracket (13; 112), said U-shaped bearing bracket (13; 112) being movable into and out of a path of movement of a piece to be perforated by a piston-cylinder unit which is actuated from either side of a piston, said piston-cylinder unit being housed in a quadrate fastening element (20) connected to a machine frame, a plurality of guide bolts (15, 16; 135, 139) of said U-shaped bearing bracket (13; 112) movably disposed within said quadrate fastening element (20), said plurality of guide bolts (15, 16; 135, 139) maintaining said bearing bracket (13; 112) fixed against rotation within respect to said fastening element (20), the improvement comprising:

said quadrate fastening element (20) forming a cylinder having a blind bore (21) extending from a blind bore side facing said U-shaped bearing bracket (13), in which said piston (23), having seal rings (24), is sealingly guided in a displaceable manner, said blind bore (21) being closed by a seal bushing (26), through which extends a piston rod (25) connected at one end to said piston (23) and connected at an opposite end to said U-shaped bearing bracket (13), and said blind bore (21) transforming on said blind bore side facing said bearing block (13) into a blind bore end section (22) having a larger diameter forming a shoulder against which said seal bushing (26) rests.

2. A perforator in accordance with claim 1, wherein
said seal bushing (26) is fixed by a retaining ring (27) in said end section (22) of said blind bore (21) and is maintained in contact with said shoulder.

3. In a perforator in accordance with claim 2, wherein
said guide bolts (15, 16) of said U-shaped bearing bracket (13) are guided in guide bushings (17, 18), which are inserted into element bores (29) of said quadrate fastening element (20) and are immovably held in said element bores (29) at both bolt ends of said guide bolts (15, 16) by a plurality of retaining rings (30, 31).

4. In a perforator in accordance with claim 3, wherein
said element bores (29) only extend over a portion of a thickness of said quadrate fastening element (20) and, on an element bore end facing away from said U-shaped bearing bracket (13), transform into element bore end sections (28) having an enlarged element bore diameter, in which are positioned on receptacle one of said retaining rings (30, 31) for securing said guide bushings (17, 18), said element bore section being closed by a threaded plug (32).

5. A perforator in accordance with claim 4, wherein
said quadrate fastening element (20) comprises a fastening clamp connected to an L-shaped part (34) forming a single piece, and a leg of a part of said single piece facing away from said fastening element (20) is provided with a through-bore (35) to receive a fastening screw.

6. In a perforator in accordance with claim 1, wherein said guide bolts (15, 16) of said U-shaped bearing bracket (13) are guided in guide bushings (17, 18), which are inserted into element bores (29) of said quadrate fastening element (20) and are immovably held in said element bores (29) at both bolt ends of said guide bolts (15, 16) by a plurality of retaining rings (30, 31).

7. A perforator in accordance with claim 6, wherein said element bores (29) only extend over a portion of a thickness of said quadrate fastening element (20) and, on an element bore end facing away from said U-shaped bearing bracket (13), transform into element bore end sections (28) having an enlarged element bore diameter, in which are positioned on a receptacle one of said retaining rings (30, 31) for securing said guide bushings (17, 18), said element bore section being closed by a threaded plug (32).

8. In a perforator in accordance with claim 1, wherein said quadrate fastening element (20) comprises a fastening clamp connected to an L-shaped part (34) forming a single piece, and a leg of a part of said single piece facing away from said fastening element (20) is provided with a through-bore (35) to receive a fastening screw.

9. In a perforator having a perforating disk (10; 110) rotatably seated in a U-shaped bearing bracket (13; 112), said U-shaped bearing bracket (13; 112) being movable into and out of a path of movement of a piece to be perforated by a piston-cylinder unit which is actuated from either unit side, said piston-cylinder unit being housed in a fastening element (20) which is connected to a machine frame, a plurality of guide bolts (15, 16; 135, 139) of said U-shaped bearing bracket (13; 112) movably disposed within said fastening element (20), said plurality of guide bolts (15, 16; 135, 139) maintaining said bearing bracket (13; 112) fixed against rotation with respect to said fastening element (20), the improvement comprising:

said fastening element (20) constructed as a single piece and forming a plate-shaped cylinder oriented parallel to a plane of said perforating disk (110), a plate-shaped piston (124) displaceably guided in a quadrate sealed recess (127) of said plate-shaped cylinder and fixedly connected to said bearing bracket (112) by a sealed piston rod (118) displaceably guided in said plate-shaped cylinder, both piston sides of said plate-shaped piston (124) extending crosswise to a displacement direction of said plate-shaped piston (124) being provided with sealing elements (125, 126) which seal on all recess sides of said quadrate sealed recess (127) of said cylinder, a plurality of cover plates (147, 148) sealing said quadrate sealed recess (127), complementing a cylinder chamber for said plate-shaped piston (124), and said sealed piston rod (118) sealed by a sealing element (134) maintained by a closing element (132) in a widened shoulder (131) of a cylinder bore in said cylinder for receiving said sealed piston rod (118).

10. In a perforator in accordance with claim 9, wherein
said quadrate sealed recess (127) comprises an opening in said cylinder into which a rectangular tube section (128, 129) is sealingly seated as a piston guide.

11. In a perforator in accordance with claim 10, wherein
said rectangular tube section (128, 129) has tube ends which abut facing sides of said plate-shaped cylinder.

12. A perforator in accordance with claim 9, wherein
cylinder dimensions of said cylinder in a direction of an axis of rotation (111) of said perforating disk (110) correspond to associated bearing bracket dimensions of said bearing bracket (112).

13. In a perforator in accordance with claim 12, wherein
control lines (143, 145) for said piston-cylinder unit enter into said cylinder and end in an area of said facing cylinder sides oriented crosswise to said displacement direction of said plate-shaped piston (124) in said recess (127) of said cylinder and are accessible through threaded connections (144, 146) in a side extending parallel to said displacement direction of said plate-shaped piston (124).

14. In a perforator in accordance with claim 13, wherein
said cylinder has, outside of the piston-cylinder unit in a piston-cylinder unit end section facing away from said bearing bracket (112), a fastening receptacle (149), T-shaped in cross section, having a threaded bore (150) for receiving a fastening screw.

15. In a perforator in accordance with claim 9, wherein a rectangular tube section (128, 129) has tube ends which abut facing sides of said plate-shaped cylinder.

16. In a perforator in accordance with claim 15, wherein cylinder dimensions of said plate-shaped cylinder in a direction of an axis of rotation (111) of said perforating disk (110) correspond to associated bearing bracket dimensions of said bearing bracket (112).

17. A perforator in accordance with claim 15, wherein control lines (143, 145) for said piston-cylinder unit enter into said plate-shaped cylinder and end in an area of said facing cylinder sides oriented crosswise to said displacement direction of said plate-shaped piston (124) in said recess (127) of said plate-shaped cylinder and are accessible through threaded connections (144, 146) in a side extending parallel to said displacement direction of said plate-shaped piston (124).

18. In a perforator in accordance with claim 15, wherein said cylinder has, outside of the piston-cylinder unit in a piston-cylinder unit end section facing away from said bearing bracket (112), a fastening receptacle (149), T-shaped in cross section, having a threaded bore (150) for receiving a fastening screw.

19. In a perforator in accordance with claim 9, wherein cylinder dimensions of said plate-shaped cylinder in a direction of an axis of rotation (111) of said perforating disk (110) correspond to associated bearing bracket dimensions of said bearing bracket (112).

20. In a perforator in accordance with claim 9, wherein control lines (143, 145) for said piston-cylinder unit enter into said plate-shaped cylinder and end in an area of said facing cylinder sides oriented crosswise to said displacement direction of said plate-shaped piston (124) in said recess (127) of said cylinder and are accessible through threaded connections (144, 146) in a side extending parallel to said displacement direction of said plate-shaped piston (124).

21. In a perforator in accordance with claim 9, wherein said cylinder has, outside of the piston-cylinder unit in a piston-cylinder unit end section facing away from said bearing bracket (112), a fastening receptacle (149), T-shaped in cross section, having a threaded bore (150) for receiving a fastening screw.

* * * * *